United States Patent [19]

Nishihara et al.

[11] Patent Number: 4,538,668

[45] Date of Patent: Sep. 3, 1985

[54] ASSEMBLY ROLL FOR HIGH TEMPERATURE SERVICE

[75] Inventors: Hisakatsu Nishihara, Hirakata; Arata Yoshimitsu, Katano, both of Japan

[73] Assignee: Kubota, Ltd., Osaka, Japan

[21] Appl. No.: 594,417

[22] Filed: Mar. 28, 1984

Related U.S. Application Data

[63] Continuation of Ser. No. 250,551, Apr. 3, 1981, abandoned.

[30] Foreign Application Priority Data

Apr. 23, 1980 [JP] Japan ................. 55-55241

[51] Int. Cl.$^3$ ........................... B22D 11/128
[52] U.S. Cl. .................. 164/448; 164/442; 75/126 J
[58] Field of Search ............ 164/448, 442, 484; 75/126 J, 126 B

[56] References Cited

U.S. PATENT DOCUMENTS 4,256,486  3/1981  Yoshioka et al. ............ 75/125

FOREIGN PATENT DOCUMENTS 0062920 10/1982 European Pat. Off. ......... 164/448
0048521  4/1977 Japan ....................... 164/448
0068161  5/1980 Japan ....................... 164/448

Primary Examiner—Kuang I. Lin
Attorney, Agent, or Firm—Oblon, Fisher, Spivak, McClelland & Maier, P.C.

[57] ABSTRACT

A roll, for high temperature service in continuous slab casting, has having its sleeve shrinkage-fitted onto the roll shaft under tight contact state, wherein the alloy composition of the sleeve as expressed in % by weight is as follows.

The principal components are:
C: 0.20 or less
Si: 0.1 to 2.0
Mn: 0.1 to 2.0
Cr: 10 to 14
N: 0.02 to 0.20; provided
C+N: 0.30 to 0.35; and in addition to the principal components specified above, permissably one or more components being
Ni: 0.1 to 5.0
Mo: 0.1 to 2.0
V: 0.01 to 0.3
W: 0.1 to 0.3, and
the balance is Fe.

8 Claims, 8 Drawing Figures

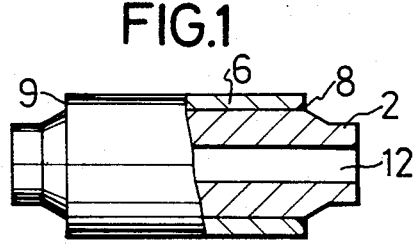
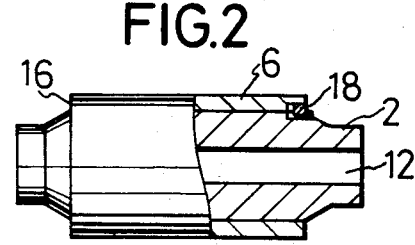
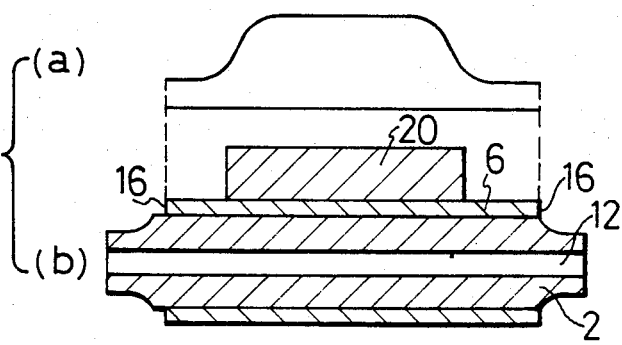
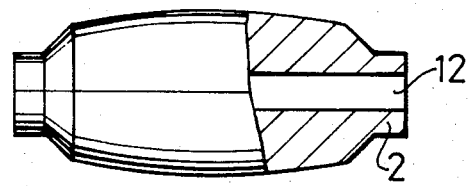

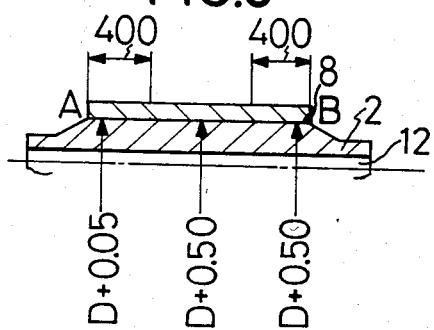
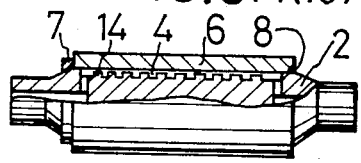
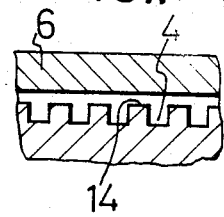
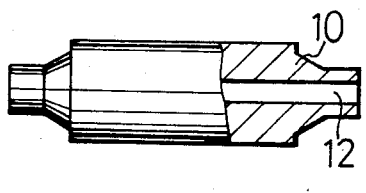

ASSEMBLY ROLL FOR HIGH TEMPERATURE SERVICE

This application is a continuation of application Ser. No. 250,551, filed Apr. 3, 1981, now abandoned.

BACKGROUND OF THE INVENTION

The invention relates to an assembly roll to be used as pinch roll, guide roll or the like for continuous slab casting.

Conventionally, the rolls applied for said purpose are roughly classified as sleeve rolls as shown in FIG. 6, and solid rolls as shown in FIG. 8. A sleeve roll has a spiral water-cooling groove 4 provided in the outer circumference of a roll shaft 2, on which is fitted a sleeve 6, and is formed into an integral form by welding 8 at one end. The roll shaft 2 is usually made of ordinary steel, while the sleeve 6 is usually made of Cr-Mo low alloy steel. Whereas, a solid roll 10 is wholly made of Cr-Mo low alloy steel, especially a forged product thereof, and a cooling water passage 12 is provided in the shaft center. These conventional rolls have the following defects, both in structure and in material.

In the sleeve roll, as shown in FIG. 6, the sleeve inner side is cooled with water and the outer side contacts with high temperature slab to cause an enormous temperature gradient, so that initiation and growth of cracks due to generated thermal stress become excessive, which often results in shortening of service life of the roll. Besides, bending stress becomes larger due to the force loaded on the roll. In this case, concentration of bending stress should be rare if the sleeve 6 and roll shaft 2 are in tight contact over the entire length, but, practically, protruding parts 14 of spiral groove are not in contact with the sleeve inner face, and the gap tends to grow further as the protruding parts 14 are corroded and worn in the course of hours of use. As the gap increases, the stress is concentrated in the central part in the axial direction of the sleeve 6, and cracks are initiated in the sleeve 6 and develop in an early stage until finally leading to rupture, thereby causing a splash-out accident of the cooling water. As a result, the continuous casting operation is forced to be interrupted. Furthermore, in this kind of sleeve roll, corroded products and deposits are often collected in the spiral water cooling groove 4 to block the flow of cooling water. In this case, the cooling water may splash out of water-leak-preventive ring 7 provided between the free end of the sleeve 6 and the roll shaft 2, or the temperature of the sleeve 6 may be raised.

In the solid roll, on the other hand, since the surface is heated by contacting with high temperature slab and is cooled with water the next moment, thus subjected to severe heat cycles of heating and cooling, heat cracks are often caused, and when the bending stress is concentrated on such cracks, the cracks develop rapidly until leading to roll breakage accident. In this case, again, the continuous casting operation is forced to be interrupted. As a countermeasure, a high grade material excelling in heat crack resistance may be used, but since the entire roll must be made of such expensive material, it is not practical, economically. Or, in order to improve the material characteristics of the roll, hardening and tempering are necessary, but it is very difficult to treat the entire roll body. At present, accordingly, satisfactory material characteristics can not be obtained.

The conventional rolls, hence, require improvements not only in their structure, but also in the roll materials. Although Cr-Mo low alloy steels (for example, 1%Cr-0.3%Mo steel) are mainly used as the material for the sleeve or roll in the conventional sleeve roll or solid roll, which are, as compared with ordinary steels, excellent roll materials, they are not satisfactory yet from the viewpoint of the characteristics required of this kind of roll for continuous casting, especially with respect to heat crack resistance.

BRIEF SUMMARY OF THE INVENTION

With the background of such defects and problems as mentioned above, the present invention presents a novel assembly type roll capable of extending the service life of the roll for high temperature service from the aspects of both roll material and roll structure. The sleeve has the following alloy composition. All contents are expressed in % by weight.

C: 0.20% or less
Si: 0.1 to 2.0%
Mn: 0.1 to 2.0%
Cr: 10 to 14%
N: 0.02 to 0.20%, and C+N: 0.03 to 0.35%
Fe: balance.

Furthermore, as the alloy composition of the sleeve, besides the principal components C: 0.01 to 0.20%
Si: 0.1 to 2.0%
Mn: 0.1 to 2.0%
Cr: 10 to 14%
N: 0.02 to 0.20%, and C+N: 0.03 to 0.35% in order to improve the properties, one or more of

Ni: 0.1 to 5.0%
Mo: 0.1 to 2.0%
V: 0.01 to 0.3%
W: 0.1 to 2.0% are contained, and the balance is Fe. The invention presents an assembly roll for high temperature service possessing such composition as mentioned above.

BRIEF DESCRIPTION OF THE DRAWINGS

FIG. 1 is a partially cutaway front view of the roll relating to the present invention;

FIG. 2 shows a sleeve in another embodiment relating to the invention;

FIG. 3(a) is a temperature distribution chart of the sleeve surface during continuous casting of slabs;

FIG. 3(b) is a front view showing the operation of continuous casting of slabs;

FIG. 4 is a partially cutaway front view of an ideal roll shaft assumed corresponding to the temperature distribution;

FIG. 5 is a dimensional drawing of an embodied roll shaft;

FIG. 6 is a partially cutaway front view of a conventional sleeve roll as in prior art;

FIG. 7 is a partially enlarged view of the same; and

FIG. 8 is a partially cutaway front view of a conventional solid roll as in prior art.

DETAILED DESCRIPTION

The alloys for the invention are so composed as to exhibit excellent properties, particularly as the alloys for slab continuous casting rolls, and the reasons for limiting the content range of each component are described below.

Since the roll relating to the invention is, structurally, designed to sufficiently withstand the load stress exclusively with the roll shaft, the most important requirement for the sleeve is the resistance to heat crack under cyclic thermal loads of heating and cooling. Secondly, since the roll surface contacts with high temperature slab and is subject to high temperature oxidation and corrosion due to cooling water, sufficient resistance to these factors is also essential. The alloy composition should be determined from this respect, in particular.

Specifically, the content of C should be as low as possible from the viewpoint of heat crack resistance, but it is practically difficult to limit below 0.01% for melting in ordinal atmosphere. At a higher content of C, on the other hand, the strength and hardness are increased, and supporting strength to the charged load and wear resistance are improved, but the toughness drops and heat crack resistance notably deteriorates. Hence, the upper limit is 0.2%.

Both Si and Mn act as deoxidizing elements, and are unavoidably restricted to a minimum of about 0.1%. If added at more than 2.0%, they do not bring about corresponding effect, and Si, in particular, invites deterioration of toughness. Hence, a proper range of both elements is 0.1 to 2.0%.

Cr is the most effective element in the sleeve alloy of the present invention. In order to satisfy the three major requirements simultaneously, namely, heat resistance, corrosion resistance and heat crack resistance, it is necessary that Cr be contained more than 10%. However, if the content exceeds 14%, the toughness decreases, and heat crack resistance deteriorates, and growth and development of initiated cracks are accelerated.

N is an effective element which further improves the characteristics of the alloy when added in a small amount to the principal components (C, Si, Mn, and Cr) mentioned above. When contained in an amount more than 0.02%, this element improves the strength and toughness of the alloy, and greatly enhances the heat crack resistance, which is the most important condition as the material for continuous casting roll, thus acting very effectively. But if the content exceeds 0.20%, pinholes and similar gas defects objectionable to the quality of sleeve are likely to occur, and the toughness lowers significantly, so that the heat crack resistance is lowered.

Meanwhile, N behaves, in its proper content range, similarly as C. Therefore, when the two elements are both contained near the upper limits, unfavorable results for the heat crack resistance may take place. Hence, the sum of C and N should be controlled within the range of 0.03 to 0.35%.

The alloy containing said principal components to be used as the sleeve alloy can exhibit a sufficiently excellent performance.

In addition to said principal components, by adding alloying elements Ni, Mo, V, and W solely or in combination, a further advanced heat crack resistance may be imparted to the sleeve alloy. The content range of each additional alloying element is determined by the following reasons.

Ni at a content of more than 0.1% shows an evident effect and improves the heat crack resistance, but, when contained more than 5%, its effect is saturated, and the coefficient of thermal expansion increases, which is unvariable for the sleeve material. Also, it is not economical to use the expensive Ni excessively.

Mo and W, like Ni, contribute to the enhancement of heat crack resistance, and their effects are sufficient at 0.1% or more. Above 2% content, to the contrary, they tend to reduce the toughness. Also, it is not economical to use these expensive elements excessively.

V is also an element to improve the heat crack resistance, and it is effective at 0.01% or more, but its effect is saturated at more than 0.3%. This is an expensive element, too, and it is not economical to add a higher content.

The alloy having such composition as mentioned above is used as the sleeve material in an assembly type roll of a particular structure described below. In order to obtain specified sleeve materials economically and at high quality from the alloy of said composition, it is most suitable to produce the sleeve by centrifugal casting. Furthermore, in order to improve the heat resistance, corrosion resistance, and heat crack resistance of the alloy of sleeves to a more satisfactory level, it is effective to give heat treatment by, after casting, heating to 950° to 1080° C. and holding the temperature for a proper duration, then quenching in either water, oil or air, then heating again to 600° to 750° C. for tempering.

Referring now to the roll structure of the assembly type roll in this invention, it must be first noted that the material characteristics, however excellent they may be as mentioned above, can not be fully utilized unless the roll structure is appropriate. The assembly type roll of the invention, unlike the conventional sleeve roll or the solid roll, consists of a roll shaft 2 and a sleeve 6 as shown in FIG. 1 or 2, wherein the sleeve 6 is shrinkage-fitted to the roll shaft 2 under tight contact state. In the roll structure having the sleeve 6 shrinkage-fitted to the roll shaft 2 under tight contact state, a heat crack propagates slowly, or in case the crack propagates to break down the sleeve 6, the crack stays within the sleeve 6 and does not run continuously into the roll shaft 2. The load applied on the roll may be borne by both the sleeve 2 and the roll shaft 6, even if a heat crack is initiated on the sleeve surface. Since a crack does not reach to the roll shaft 2, the continuous casting operation is not interrupted, and water leak does not occur either, so that the structural advantages are obtained. In this case, the sleeve 6 is replaced periodically according to the designed service life, while the roll shaft 2 may be used semipermanently and does not require such a high grade material as used in the sleeve, and may be sufficiently made of ordinary steel or low alloy steel. Also, when providing a passage for cooling water in the roll shaft 2, the complicated spiral water cooling groove as in the conventional sleeve roll is not necessary, and it is enough to provide a water cooling passage 12 only in the shaft center part.

In the structure shown in FIG. 1, one end 8 of the sleeve 6 is welded after shrinkage-fitting, while the other end 9 is free. In the structure in FIG. 2, both end parts 16, 16 are free.

It is necessary to provide a countermeasure to prevent rotation of the sleeve 6, by cutting grooves in the axial direction across the outer face of the roll shaft and inner face of the sleeve in plural positions at one end or both ends of the sleeve 6 and inserting cotter pins 18 into these grooves and locking the pins 18 by building up weld in the opening of the grooves, or by providing a means which permits relative movement of the roll shaft and sleeve in the axial direction but integrally fits them together in the rotational direction.

When fabricating an assembly roll by shrinkage-fitting the sleeve 6 to the roll 2, the following problems should be taken into consideration. Firstly, in an assembly roll, when it is operated a long time while keeping contact with the continuously cast high temperature slabs, only the sleeve 6 is heated and tends to elongate in the axial direction. In this case, if one end is fixed as in FIG. 1, since one end 8 is secured, the elongation is concentrated on the other free end 9, but this free end 9 of the sleeve 6 is scarcely heated because the slab usually contacts in the middle parts and does not at the end parts. Therefore, when the free end 9 of the sleeve 6 is tightly shrinkage-fitted and secured firmly, the sleeve 6 can not elongate in the axial direction, so that the sleeve 6 may be deformed, expanding the outside diameter in the middle part thereof. This phenomenon also occurs similarly even in a structure having double free end as in FIG. 2 if the securing of the both free ends 16, 16 is too tight.

Another important problem is that the temperature distribution of the sleeve 6 in the state used in continuous casting presents a crown curve, high in the middle part and lower at both ends as shown in FIG. 3(a), due to contact with high temperature slab 20. It does not matter when the shrinkage fit between the sleeve 6 and roll shaft 2 is uniform throughout its length and the tight contact state is always maintained, but if the casting operation is continued charge after charge, the cooling water to cool the product slab is not sprinkled over the roll, or the quantity of water in the water cooling passage 12 in the roll shaft center part is insufficient, the sleeve diameter expands due to thermal expansion depending on the temperature distribution of crown curve, and middle portion of the sleeve 6 may be separated from the roll shaft 2, thereby causing a gap between them. Also in this case, both ends do not swell due to thermal expansion, and the securing force of shrinkage fit acts to arrest shift of the sleeve. As a result, the cooling effect from the roll shaft 2 may not be transmitted to this gap part opened against the roll shaft due to thermal expansion in the middle part of the sleeve, and the temperature of the sleeve surface may rise abnormally, thereby causing various problems. Furthermore, in this case, if a large load is applied from the slab 20 to the sleeve 6, a deviation may be forced at one of the free end parts 9, 16 (FIG. 1) (FIG. 2), so that the sleeve 6 may not shrink to the original dimensions upon completion of continuous casting operation and may possibly cause a crack.

In order to solve these problems, in this invention, it is proposed to provide an allowance for shrinkage fit as described below when shrinkage-fitting the sleeve 6 to an ordinary roll shaft 2 measuring 300 to 500 mm in diameter. Specifically, where one end is secured as in FIG. 1, a large allowance of 0.2 to 1.0 mm for shrinkage fit should be preserved between the middle part and the secured part 8 of the sleeve 6 so as to secure the shaft 2 with a strong tightening force, while a small allowance of 0 to 0.2 mm for shrinkage fit should be provided in the vicinity (about more than 500 mm from the end) of the free end 9 to secure the shaft 2 with a weak tightening force. On the other hand, where both ends are free as in FIG. 2, similarly, a large allowance of 0.2 to 1.0 mm for shrinkage fit should be preserved in the middle part, and a small 0 to 0.2 mm allowance should be provided in the vicinity (for a length of about 100 to 500 mm from the end) of both free ends 16, 16.

In this manner, in either case, the elongation of the sleeve 6 due to thermal expansion may be released at the free end 9, 16, and, at the same time, the tight contact state may be always maintained without causing gap between the sleeve 6 and the roll shaft 2, so that deformation to expand the diameter and abnormal heating of the sleeve 6 may be prevented, and also that initiation and propagation of crack and wear possibly leading to shortening of the service life may be restricted.

In order to shrinkage-fit the sleeve 6 to the roll shaft 2 with a partially differing allowance for shrinkage fit, it is necessary to machine preliminarily the outer circumference of the roll shaft 2 so that a specified allowance for shrinkage fit may be obtained in each part, and most ideally it is proposed to machine the roll outer circumferential surface (the sleeve shrinkage-fit surface) into a crown shape, as shown in FIG. 4, according to the sleeve temperature distribution in the state of use given in FIG. 3.

Regarding the shrinkage-fit assembly structure of the sleeve 6, when the single end fixed type and the double end free type are compared, in the latter case, it is possible to keep the elongation and contraction of the sleeve 6 at the free ends 16, 16 to less than half in the former case, so that it may be effective to prevent swelling deformation and crack of the sleeve 6.

Described below are some examples of the embodiments of the present invention.

EMBODIMENTS

Samples

Each sample was melted in a high frequency melting furnace, and cast into a test piece measuring 160 mm in outside diameter, 28 mm in thickness and 220 mm in length by metal mold centrifugal casting, and, after casting, was heat-treated by quenching in oil after heating to 1030° C. and by tempering at 680° C. Then, the test piece was machined into a ring test piece measuring 150 mm in outside diameter, 23 mm in thickness and 70 mm in length, which was presented for heat crack test.

Heat crack test method. The outer surface of each test piece was heated by 100 KC high frequency current, and heating is stopped when the surface temperature reaches 550° C., then the heated surface was cooled in water. This cycle of heating and cooling in water was repeated until a heat crack was initiated on the surface of test piece. That is, in this test method, the number of cycles of heating and cooling in water until initiation of crack increases as the heat crack resistance of the material is higher.

Table 1 shows the chemical composition of each sample. Table 2 records the results of the heat crack test.

Examining the test results, it is found that sample No. 1, ordinary steel, and samples No. 2 and No. 3, low alloy steels, initiated cracks in an early stage. Samples No. 4 and No. 5, which were similar to the alloys disclosed in the present invention except for the content of Cr, initiated heat cracks early. Sample No. 6, which did not contain N, was evidently insufficient in heat crack resistance. Sample No. 7, which contained N over the specified range and exceeded the specified sum of N+C, indicated a drop in the heat crack resistance. Sample No. 8, of which composition was within the specified range but sum of C+N was 0.37%, higher than the upper limit of 0.35%, also showed a decline in the heat crack resistance. By contrast, samples No. 9 to No. 17, which are exemplary of the alloys of the specified composition of the invention, all exhibited an excellent heat crack resistance.

TABLE 1

| Sample No. | | Composition of Samples (% by weight) | | | | | | | | |
|---|---|---|---|---|---|---|---|---|---|---|
| | | C | Si | Mn | Cr | N | Ni | Mo | W | V |
| Reference | 1 | 0.19 | 0.60 | 1.12 | — | — | — | — | — | 0.10 |
| alloys | 2 | 0.18 | 0.35 | 0.89 | 1.03 | — | — | 0.31 | — | 0.15 |
| | 3 | 0.15 | 0.44 | 0.73 | 2.28 | — | — | 1.04 | — | 0.11 |
| | 4 | 0.15 | 0.46 | 0.82 | 8.92 | 0.12 | — | 0.96 | — | — |
| | 5 | 0.03 | 0.33 | 0.89 | 15.33 | 0.10 | — | — | — | — |
| | 6 | 0.09 | 0.37 | 0.90 | 12.35 | — | — | — | — | — |
| | 7 | 0.10 | 0.25 | 0.86 | 12.30 | 0.28 | — | — | — | — |
| | 8 | 0.18 | 0.40 | 0.91 | 12.75 | 0.19 | — | — | — | — |
| Alloys | 9 | 0.08 | 0.32 | 0.88 | 10.18 | 0.11 | — | — | — | — |
| of the | 10 | 0.09 | 0.35 | 1.03 | 12.61 | 0.13 | — | — | — | — |
| inven- | 11 | 0.08 | 0.38 | 0.90 | 13.87 | 0.09 | — | — | — | — |
| tion | 12 | 0.08 | 0.41 | 0.87 | 12.50 | 0.04 | — | — | — | — |
| | 13 | 0.06 | 0.40 | 0.75 | 12.66 | 0.18 | — | — | — | — |
| | 14 | 0.08 | 0.38 | 0.89 | 12.51 | 0.08 | 1.21 | 0.44 | — | — |
| | 15 | 0.07 | 0.40 | 0.82 | 12.66 | 0.11 | 0.85 | 0.40 | 0.92 | — |
| | 16 | 0.09 | 0.35 | 0.80 | 12.54 | 0.07 | — | 0.35 | — | 0.12 |
| | 17 | 0.08 | 0.33 | 0.77 | 12.30 | 0.06 | 0.80 | 0.38 | 0.50 | 0.11 |

(Note)
The mark (—) means that the specific element was not added particularly, and, hence, was not analyzed.

TABLE 2

| | Heat Crack Test |
|---|---|
| Sample No. | Number of heat cycles until initiation of heat crack |
| Reference 1 | 350 |
| alloys 2 | 400 |
| 3 | 450 |
| 4 | 600 |
| 5 | 650 |
| 6 | 850 |
| 7 | 800 |
| 8 | 850 |
| Alloy 9 | 1200 |
| of the 10 | 1300 |
| invention 11 | 1250 |
| 12 | 1250 |
| 13 | 1300 |
| 14 | 1350 |
| 15 | 1400 |
| 16 | 1350 |
| 17 | 1500 |

EMBODIMENTS OF ROLL ASSEMBLY

Embodiments of 480 mm diameter pinch rolls for continuous casting of wide slabs are explained below in the sequence of manufacturing processes.

(1) Fabrication of sleeves

After casting by centrifugal casting method in metal mold the materials were machined and finished to sleeves measuring 480 mm in outside diameter, 36 mm in inside diameter, and 2300 mm in length. The chemical composition of the sleeves is as follows (% by weight):

| C | Si | Mn | Cr | N | Ni | Mo | V |
|---|---|---|---|---|---|---|---|
| 0.08 | 0.41 | 0.87 | 12.65 | 0.08 | 0.82 | 0.41 | 0.05 |

The heat treatment was conducted by quenching in oil at 1000° C. for 6 hours and then by tempering at 680° C. for 10 hours.

(2) Fabrication of roll shafts

Roll shafts made of ordinary steel were machined so that the allowance for shrinkage fit might be smaller at the free end of the sleeve. The machining dimensions of the roll shaft are shown in FIG. 5 (wherein D means the inside diameter of sleeve).

(3) Assembly

The sleeve was heated to 400° C., and shrinkage-fitted to the roll shaft to build into an integral form. In FIG. 5, side A was free end, and side B was welded 8 to secure the sleeve to roll shaft firmly.

(4) Results of actual use

Conventionally, a solid roll of low alloy steel is used as a pinch roll. The solid roll, generally, cracks to a depth of about 30 mm after operation of about 5000 charges (about in a year), and is replaced. At this time, the roll diameter is usually reduced more than 6 mm. By contrast, when the roll of this invention is used in test, after operation of 20,000 charges (about in 4 years); the maximum crack depth observed is only 20 mm, and the roll is still in practically usable condition, and is actually being used continuously. The reduction of roll diameter is only 1.5 mm at the maximum. Accordingly, it is confirmed that this roll has a service life of four times or more as compared with the conventional roll.

As described so far, the assembly type roll of the present invention was developed by improving the conventional sleeve roll and solid roll from the standpoints of both the roll material and roll structure, and it is particularly suitable as a pinch roll and guide roll for continuous casting of slabs, and, moreover, it can extend the service life greatly under severe environments of use, and, hence, present an economical product. Meanwhile, the assembly type roll of the present invention may be applied not merely as the rolls for continuous casting of billets and blooms, but even in high temperature and high load services, such as the rolls for conveying plates.

What is claimed is:

1. A roll for high temperature service having a sleeve shrinkage-fitted onto a roll shaft under tight contact state, characterized by the sleeve having a composition expressed in % by weight
C: 0.06 to 0.2
Si: 0.1 to 2.0
Mn: 0.1 to 2.0
Cr: 10 to 14
N: 0.02 to 0.20
Fe: balance; and
C+N: 0.08 to 0.35.

2. A roll as defined in claim 1, wherein one end of the sleeve is secured to the roll shaft and the other end is free.

3. A roll as defined in claim 1, wherein both ends of the sleeve are free.

4. A roll as defined claim 1 wherein a cooling water passage is provided in the roll shaft in the axial direction thereof.

5. A roll for high temperature service having a sleeve shrinkage-fitted onto a roll shaft under tight contact state, characterized by the sleeve having a composition expressed in % by weight
C: 0.06 to 0.2
Si: 0.1 to 2.0
Mn: 0.1 to 2.0
Cr: 10 to 14
N: 0.02 to 0.20
as principal components, provided
C+N: 0.08 to 0.35
and, in addition, one or more of
Ni: 0.1 to 5.0
Mo: 0.1 to 2.0
V: 0.01 to 0.3
W: 0.1 to 2.0
and Fe for the balance.

6. A roll as defined in claim 5, wherein one end of the sleeve is secured to the roll shaft and the other end is free.

7. A roll as defined in claim 5, wherein both ends of the sleeve are free.

8. A roll as defined in claim 5 wherein a cooling water passage is provided in the roll shaft in the axial direction thereof.

* * * * *